United States Patent
Vivanco

(10) Patent No.: US 12,464,419 B2
(45) Date of Patent: Nov. 4, 2025

(54) HANDOVER PERFORMANCE WHEN SERVING AERIAL USER EQUIPMENT OVER ADVANCED NETWORKS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

(*) Notice: Subject to any disclaimer, the term of this patent is extended or adjusted under 35 U.S.C. 154(b) by 365 days.

(21) Appl. No.: 17/662,564

(22) Filed: May 9, 2022

(65) Prior Publication Data

US 2023/0362746 A1 Nov. 9, 2023

(51) Int. Cl.
| | |
|---|---|
| *H04W 36/00* | (2009.01) |
| *H04W 24/08* | (2009.01) |
| *H04W 36/08* | (2009.01) |
| *H04W 84/06* | (2009.01) |

(52) U.S. Cl.
CPC ....... *H04W 36/0061* (2013.01); *H04W 24/08* (2013.01); *H04W 36/08* (2013.01); *H04W 84/06* (2013.01)

(58) Field of Classification Search
CPC . H04W 36/0061; H04W 24/08; H04W 36/08; H04W 84/06; H04W 36/0072; H04W 36/324; H04B 17/27; H04B 17/318
See application file for complete search history.

(56) References Cited

U.S. PATENT DOCUMENTS

| | | | | |
|---|---|---|---|---|
| 6,108,539 | A * | 8/2000 | Ray | H04B 7/18506 455/430 |
| 6,708,041 | B1 * | 3/2004 | Butovitsch | H04W 52/50 370/320 |
| 2014/0171088 | A1 * | 6/2014 | Edara | H04W 36/302 455/440 |
| 2014/0206356 | A1 * | 7/2014 | Xie | H04W 36/0072 455/436 |

(Continued)

OTHER PUBLICATIONS

"Study on enhanced LTE support for aerial vehicles," RP-170779, NTT Docomo, Ericsson, Mar. 2017, http://www.3gpp.org/ftp/tsg_ran/tsg_ran/TSGR_75/Docs/RP170779.zip, Accessed on Mar. 8, 2022, 4 pages.

*Primary Examiner* — Sudesh M. Patidar

(57) ABSTRACT

An architecture to improving handover performance when servicing unmanned aerial vehicles over advanced networks. A method can comprise determining a first group of frequencies that serving cell equipment is capable of supporting, identifying a first frequency of the first group of frequencies and a second frequency of the first group of frequencies based on determining a probability value associated with the first frequency and the second frequency overlapping, determining a second group of frequencies that are supported by an unmanned aerial vehicle determining that the unmanned aerial vehicle is using the first frequency to communicate with the serving cell equipment, determining handover serving cell equipment for the unmanned aerial vehicle based on tracking data associated with the unmanned aerial vehicle, and instructing the target cell equipment to decrease a first transmission gain value associated with the first frequency and increase a second transmission gain value associated with the second frequency.

20 Claims, 12 Drawing Sheets

(56) References Cited

U.S. PATENT DOCUMENTS

| | | | | |
|---|---|---|---|---|
| 2015/0334607 | A1* | 11/2015 | Singh | H04W 36/0079 |
| | | | | 455/437 |
| 2016/0337047 | A1* | 11/2016 | Khoshnevisan | H04L 1/0001 |
| 2020/0236602 | A1* | 7/2020 | Mahkonen | H04W 76/25 |
| 2021/0160703 | A1* | 5/2021 | Luo | H04W 48/10 |
| 2022/0408377 | A1* | 12/2022 | Kotaru | H04W 52/241 |
| 2023/0009653 | A1* | 1/2023 | Vejlgaard | H04B 7/088 |
| 2023/0156545 | A1* | 5/2023 | Wawrowski | H04W 36/304 |
| | | | | 455/436 |

* cited by examiner

HANDOVER PERFORMANCE WHEN SERVING AERIAL USER EQUIPMENT OVER ADVANCED NETWORKS

TECHNICAL FIELD

The disclosed subject matter relates to improving handover performance when servicing aerial user equipment (aerial UE) or unmanned aerial vehicles (UAVs) over advanced networks, such as, but not limited to, long term evolution (LTE) and/or fifth generation (5G) networks.

BACKGROUND

Wireless operators can use terrestrial cellular network equipment, such as long-term evolution (LTE) and/or fifth-generation (5G) core mobile network operator (MNO) equipment to provide services to aerial UE. Aerial user equipment UE can have multiple use cases (e.g., delivery, monitoring, . . . ). Wireless operators can have aerial coverage maps, which can indicate areas with and without cellular coverage.

DETAILED DESCRIPTION

Figure 1:
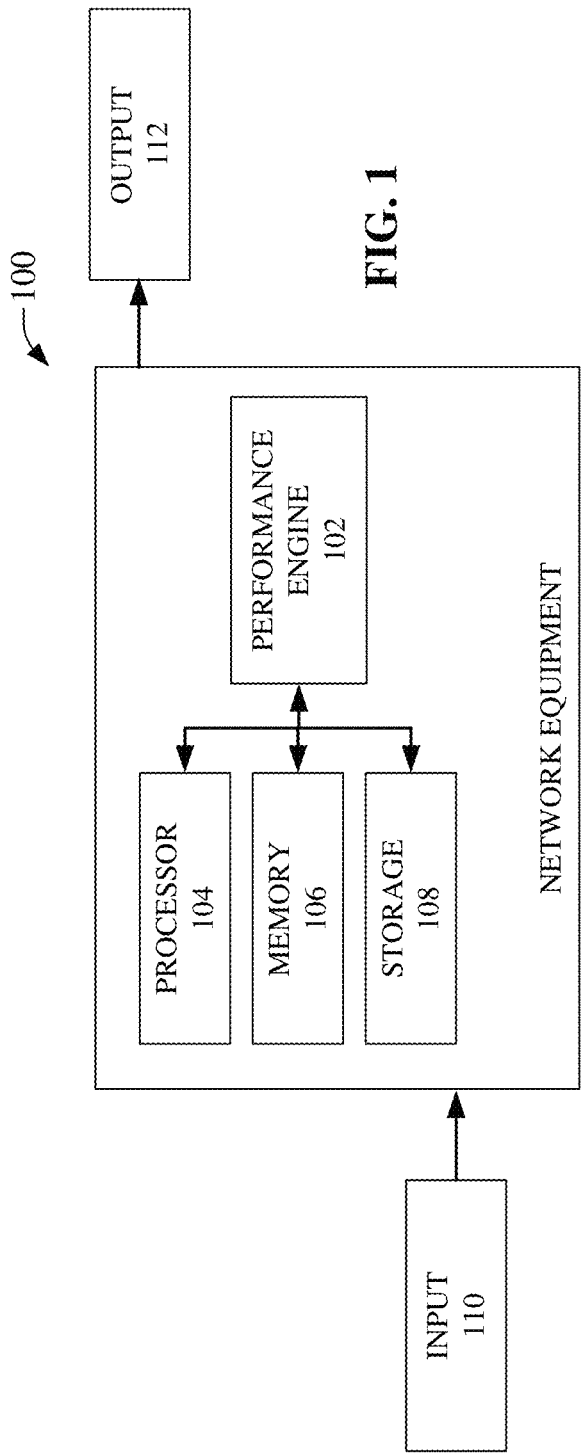
FIG. 1 is an illustration of a system that improves handover performance when servicing aerial UE or UAVs over advanced networks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter, in accordance with various embodiments, provides a system, apparatus, equipment, or device comprising: a processor (and/or one or more additional processors), and a memory (and/or one or more additional memories) that stores executable instructions that, when executed by the processor, facilitate performance of operations. The operations can comprise determining a first group of frequencies that serving cell equipment is capable of supporting, identifying a first frequency of the first group of frequencies and a second frequency of the first group of frequencies based on determining a probability value associated with the first frequency and the second frequency overlapping, determining a second group of frequencies that are supported by an unmanned aerial vehicle, determining that the unmanned aerial vehicle is using the first frequency to communicate with the serving cell equipment, determining handover serving cell equipment for the unmanned aerial vehicle based on tracking data associated with the unmanned aerial vehicle, instructing the serving cell equipment to decrease a first transmission gain value associated with the first frequency and increase a second transmission gain value associated with the second frequency, and monitoring a handover of service provided by the serving cell equipment to the handover serving cell equipment.

In regard to the foregoing the serving cell equipment can be special serving cell equipment, wherein the special serving cell equipment can be associated with groups of up tilted antennas. Further, the handover serving cell equipment can also be special serving cell equipment, wherein the special serving cell equipment can be solely dedicated to servicing the unmanned aerial equipment. Additionally, the special serving cell equipment typically can be capable of transmitting, using one or more up tilted antennas, at a transmission power value approaching 100 Watts, and the special serving cell equipment can comprise a group of amplifiers configured as a cascade of amplifiers. Moreover, the special serving cell equipment, in response to the second transmission gain value being set to the maximum value, a broadcast umbra cast by the special serving cell equipment to service the unmanned aerial vehicle can expand to cover a greater geographic coverage area. Conversely, the special serving cell equipment, in response to the first transmission gain value being set to a minimum value, a broadcast penumbra cast by the special serving cell equipment to service the unmanned aerial vehicle can be decreased to cover a smaller geographic coverage area.

In accordance with further embodiments, the subject disclosure describes methods and/or processes, comprising a series of acts that, for example, can include: determining, by a device comprising a processor, a first group of frequencies that serving cell equipment is capable of supporting, identifying, by the device, a first frequency of the first group of frequencies and a second frequency of the first group of frequencies based on determining a probability value associated with the first frequency and the second frequency overlapping, determining, by the device, a second group of frequencies that are supported by an unmanned aerial vehicle, determining, by the device, that the unmanned aerial vehicle is using the first frequency to communicate with the serving cell equipment, determining, by the device, handover serving cell equipment for the unmanned aerial vehicle based on tracking data associated with the unmanned aerial vehicle, instructing, by the device, the serving cell equipment to decrease a first transmission gain value associated with the first frequency and increase a second transmission gain value associated with the second frequency, and monitoring, by the device, a handover of service provided by the serving cell equipment to the handover serving cell equipment.

Additional acts can comprise tracking, by the device, the unmanned aerial vehicle based on subscription data and location data, based on the monitoring of the handover of service, fine tuning, by the device, the decrease of the first transmission gain value to ensure the handover of service, and based on the monitoring of the handover of service, fine tuning, by the device, the increase of the second transmission gain value to ensure the handover of service.

In regard to the foregoing, the subscription data can comprise unique serial number values, governmentally issued unique identification values, unique visual identification values affixed to the unmanned aerial vehicle, unique identification values rendered perceivable using irradiated ultra-violet light, and unique identification values rendered observable through illumination using infra-red light.

In accordance with still further embodiments, the subject disclosure describes machine readable media, a computer readable storage devices, or non-transitory machine readable media comprising instructions that, in response to execution, cause a computing system (e.g., apparatus, equipment, devices, groupings of devices, etc.) comprising at least one processor to perform operations. The operations can include determining a first group of frequencies that serving cell equipment is capable of supporting. identifying a first frequency of the first group of frequencies and a second frequency of the first group of frequencies based on determining a probability value associated with the first frequency and the second frequency overlapping, determining a second group of frequencies that are supported by an unmanned aerial vehicle, determining that the unmanned aerial vehicle is using the first frequency to communicate with the serving cell equipment, determining handover serving cell equipment for the unmanned aerial vehicle based on tracking data associated with the unmanned aerial vehicle, and instructing the serving cell equipment to decrease a first transmission gain value associated with the first frequency and increase a second transmission gain value associated with the second frequency.

Further operations can comprise monitoring a handover of service from the serving cell equipment to the handover serving cell equipment, based on the monitoring of the handover of service, fine tuning the decrease of the first transmission gain value to ensure the handover of service, and based on the monitoring of the handover of service, fine tuning the increase of the second transmission gain value to ensure the handover of service.

In regard to the foregoing, the serving cell equipment can be associated with groups of up tilted antennas, the handover serving cell equipment can be dedicated to servicing the unmanned aerial equipment, the serving cell equipment can be capable of transmitting, using at least one up tilted antenna, at a transmission power value approaching 100 Watts, and each of the handover serving cell equipment and the serving cell equipment can a group of cascading amplifiers.

In further described embodiments, a system, apparatus, equipment, or device is detailed comprising: a processor (and/or one or more additional processors), and a memory (and/or one or more additional memories) that stores executable instructions that, when executed by the processor, facilitate performance of operations. The operations can comprise determining a first group of frequencies that first serving cell equipment is capable of supporting, identifying a first frequency of the first group of frequencies and a second frequency of the first group of frequencies based on determining a probability value associated with the first frequency and the second frequency overlapping, identifying that the first frequency of the first group of frequencies and the second frequency of the first group of frequencies are supported by an unmanned aerial vehicle, determining that the unmanned aerial vehicle is using the first frequency of the first group of frequencies to communicate with the first serving cell equipment, determining that the unmanned aerial vehicle is approaching second serving cell equipment based on tracking data associated with the unmanned aerial vehicle, determining that the second serving cell equipment will become a target serving cell equipment in response to service for the unmanned aerial vehicle being handover from the first serving cell equipment to the second serving cell equipment, determining a first likelihood value representative of a first likelihood of intra-frequency interference between the first serving cell equipment and the target serving cell equipment in an overlapping coverage area, based on the first likelihood value being a maximum value, determining a second likelihood value representing a second likelihood that the unmanned aerial vehicle will experience a link transmission disrupt in response to performing the handover from the first serving cell equipment to the target serving cell equipment, instructing the target serving cell equipment to adjust a transmission gain value of associated a second group of frequencies to reduce the intra-frequency interference in response to the unmanned aerial vehicle being located in the overlapping area between the first serving cell equipment and the target serving cell equipment, performing the handover from first serving cell equipment to target serving cell equipment, and monitoring a handover of the service from the first serving cell equipment to the target serving cell equipment.

In regard to the foregoing, the first serving cell equipment and the target serving cell equipment are respectively special serving cell equipment, wherein each of the special serving cell equipment are respectively associated with groups of up tilted antennas, each of the first serving cell equipment and the target serving cell equipment are capable of transmitting, using up tilted antennas, at a transmission power value greater than standard serving cell equipment that serve terrestrial based user equipment, each of the first serving cell equipment and the target serving cell equipment comprise a group of amplifiers configured as a cascade of amplifiers, the first serving cell equipment can be special serving cell equipment, and wherein, in response to the transmission gain value being set to a minimum value, the overlapping coverage area associated with the first frequency associated with the first serving cell equipment can be reduced. Further, the target serving cell equipment can be special serving cell equipment, and wherein, in response to the transmission gain value being set to a maximum value, the overlapping coverage area of the second frequency associated with the target serving cell equipment is expanded. Additionally, the unmanned aerial vehicle can be located in the overlapping coverage area between the first serving cell equipment and the target serving cell equipment, and in response to a change in the transmission gain value associated with the first serving cell equipment, the intra-frequency interference in the overlapping coverage area between first serving cell equipment and the target serving cell equipment can be reduced. Moreover, the unmanned aerial vehicle can be located in the overlapping coverage area between the first serving cell equipment and the target serving cell equipment, wherein in response to a change in the transmission gain value of the target serving cell equipment, the unmanned aerial vehicle performs the handover from the first frequency of the serving cell equipment to the second frequency of the target cell equipment.

In additional detailed embodiments, methods and/or processes, comprising a series of acts, are described that, for example, can include: determining, by a device comprising a processor, a first group of frequencies that serving cell equipment is capable of supporting, identifying, by the device, a first frequency of the first group of frequencies and a second frequency of the first group of frequencies based on determining a probability value associated with the first frequency and the second frequency overlapping, determining, by the device, a second group of frequencies that are supported by an unmanned aerial vehicle, determining, by the device, that the unmanned aerial vehicle is using the first frequency to communicate with the serving cell equipment, determining, by the device, target cell equipment for the unmanned aerial vehicle based on tracking data associated with the unmanned aerial vehicle, instructing, by the device, the target cell equipment to decrease a first transmission gain value associated with the first frequency and increase a second transmission gain value associated with the second frequency; and monitoring, by the device, a transfer of service from the serving cell equipment to the target cell equipment.

Other acts can include tracking, by the device, the unmanned aerial vehicle based on subscription data and location data, based on the monitoring of the transfer of service, tuning, by the device, the decrease of the first transmission gain value of the target cell equipment to reduce intra-frequency interference in the overlapping area between serving cell equipment and the target cell equipment, and based on the monitoring of the transfer of service, tuning, by the device, the increase of the second transmission gain value of the target cell equipment to ensure the unmanned aerial vehicle performs a handover from the first frequency of the serving cell equipment to the second frequency of the target cell equipment.

With respect to the foregoing, the subscription data can comprise at least one of unique serial number values, governmentally issued unique identification values, unique visual identification values affixed to the unmanned aerial vehicle, unique identification values rendered perceivable using irradiated ultra-violet light, or unique identification values rendered observable through illumination using infrared light.

In accordance with yet further embodiments, the subject disclosure describes machine readable media, a computer readable storage devices, or non-transitory machine readable media comprising instructions that, in response to execution, cause a computing system (e.g., apparatus, equipment, devices, groupings of devices, etc.) comprising at least one processor to perform operations. The operations can include determining a first group of frequencies that serving cell equipment is capable of supporting, identifying a first frequency of the first group of frequencies and a second frequency of the first group of frequencies based on determining a probability value associated with the first frequency and the second frequency overlapping, determining a second group of frequencies that are supported by an unmanned aerial vehicle, determining that the unmanned aerial vehicle is using the first frequency to communicate with the serving cell equipment, determining target cell equipment for the unmanned aerial vehicle based on tracking data associated with the unmanned aerial vehicle, and instructing the target cell equipment to decrease a first transmission gain value associated with the first frequency and increase a second transmission gain value associated with the second frequency.

Additional operations can include monitoring a handover of service from the first frequency of the serving cell equipment to the second frequency of the target cell equipment, based on the monitoring of the handover of service, adjusting the decrease of the first transmission gain value of the target cell equipment to reduce intra-frequency interference in the overlapping area between serving cell equipment and the target cell equipment, based on the monitoring of the handover of service, adjusting the increase of the second transmission gain value of the target cell equipment to ensure the unmanned aerial vehicle performs a handover from the first frequency of the serving cell equipment to the second frequency of the target cell equipment.

In the foregoing context, the serving cell equipment can be associated with groups of up tilted antennas, the target cell equipment can be dedicated to servicing the unmanned aerial equipment, and the serving cell equipment and the target cell equipment can be capable of transmitting, using up tilted antennas, at transmission power values greater than standard cell equipment that serve terrestrial based user equipment.

Wireless mobile network operator entities (MNOs) can use terrestrial cellular network equipment, such as long-term evolution (LTE) and/or fifth-generation (5G) core mobile network operator (MNO) equipment (e.g., serving cell equipment, base station equipment, access point equipment, internet of things (IoT) equipment, picocell equipment, femtocell equipment, and/or other similar and pertinent equipment) to provide services to UAVs. UAVs can have multiple use cases (e.g., delivery, monitoring, . . . ). MNOs can use terrestrial cellular equipment (e.g., LTE, 5G, to provide services to UAVs). MNOs can add extra up-tilted serving cell equipment antennas to complement terrestrial coverage. These "special" serving cell equipment (e.g. terrestrial based special serving cell equipment servicing UAVs) can have high transmission power values (tx.power values) compared to traditional terrestrial based serving cell equipment which generally service terrestrial based UE. In some instances, transmission from traditional terrestrial based serving cell equipment servicing terrestrial based UE and transmissions from terrestrial based serving cell equipment specifically servicing UAVs can overlap with one another, as a consequence UAV can experience intra-frequency interference, which can lead to Radio Link Failures and/or hand over failures (HO-Failure).

Serving cell equipment with up-tilted antennas (e.g., terrestrial based special serving cell equipment) specifically servicing UAVs can have very high tx.power values. For example, serving cell equipment with up-tilted antennas (e.g., special serving cell equipment) specifically servicing UAVs can have tx.power values of about 100 Watts (100 W)

compared to traditional terrestrial serving cell equipment which serve terrestrial based UEs which can have tx.power values in the range of about 40 W. These special serving cell equipment can have higher power amplifier gain, or multiple amplifiers in cascade mode. Higher tx.power values can translate into larger coverage areas.

Figure 8:
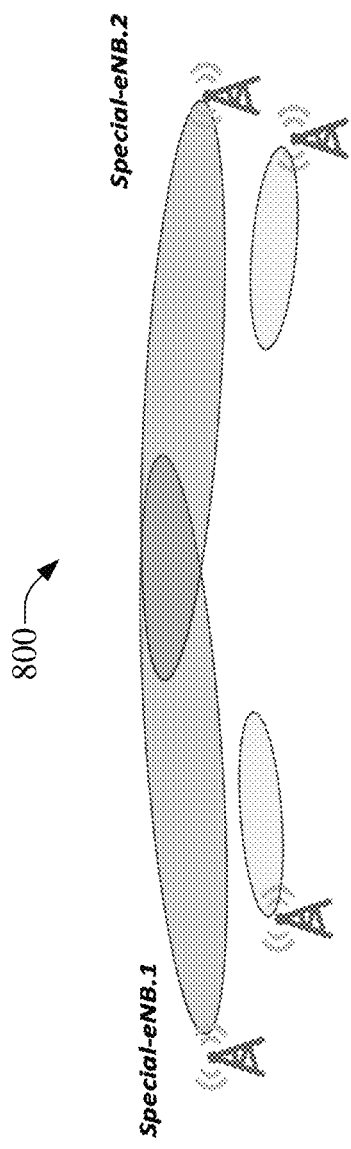
FIG. 8 depicts a scenario where serving cell equipment with up-tilted antennas can be deployed throughout a network topology, and can have multiple carriers that can overlap with each other, in accordance with aspects of the subject disclosure.

Serving cell equipment with up-tilted antennas can be deployed throughout a network topology, and can have multiple carriers (e.g., F1 and F2). These special serving cell equipment (e.g., special-eNB.1 and special-eNB.2) can overlap with each other (as illustrated in FIG. 8), as a consequence it is possible that a UAV located at the intersection of the broadcast coverage range of a first special serving cell equipment (e.g., special-eNB.1) and a second special serving cell equipment (e.g., special-eNB.2) can experience intra-frequency interference. In particular, where a UAV position in an overlapping area of the respective broadcast coverage ranges of special-eNB.1 and special-eNB.2, wherein each of special-eNB.1 and special-eNB.2 are each using a first frequency (F1). A UAV in such a situation will in most likelihood experience intra-frequency interference from each of special-eNB.1 and special-eNB.2, which can lead to Radio Link Failure and/or HO-Failure.

In regard to the foregoing, MNOs generally design their network topologies to avoid intra-frequency interference among neighboring serving cell equipment by using different frequencies on neighboring serving cell equipment that can have overlapping coverage. However, in cases with regard to special serving cell equipment, such as special-eNB.1 and special-eNB.2, this can be difficult to achieve since the overlap with regard to special serving cell equipment can be dependent on the respective tx.power values used by each special serving cell equipment and/or the respective antenna pattern employed by each of the special serving cell equipment.

The subject disclosure provides for detecting and/or identifying UE based, for example, on international mobile subscriber identifier (IMSI) values, or subscriber identity module or subscriber identification module (SIM) values (e.g., one or more integrated circuits that can securely store subscriber identification values and related key values and that can be used to identify and authenticate subscriber UE).

In various embodiments, approaching UE can be identified based on other subscriber or subscription data, such as unique UE serial number values, governmentally issued unique identification values (e.g., federal aviation administration tag values), UE manufacturer serial number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated using one-dimensional and/or multi-dimensional scanning technologies and barcode symbology, such as universal product codes (UPCs), matrix bar codes (e.g., quick response (QR) codes) comprising machine-readable optical labels, and the like that can include information about the equipment to which it is attached.

In one or more embodiments, a UAV may be tracked and monitored by special serving cell equipment through use of artificial intelligence technologies, neural networking architectures, collaborative filtering processes, machine learning techniques, and/or big data mining functionalities can be utilized, wherein, for example, probabilistic determinations based at least in part on cost benefit analyses (e.g., the cost of taking a particular action is weighed against the benefit of taking the particular action, wherein in response to determining that the benefit associated with the action outweighs the cost associated with the action, the action is identified as an action worthy of consideration and implementation) can be undertaken. In additional and/or alternative other embodiments, artificial intelligence technologies, neural networking architectures, collaborative filtering processes, machine learning techniques, Bayesian belief systems, big data mining and data analytic functionalities, and the like, can be employed, wherein, for example, multi-objective optimization (e.g., Pareto optimization) can be used to determine whether or not an action should be initiated and implemented. Multi-objective optimization can ensure that first actions or groups of first actions can only be implemented provided that other second actions or groups of other second actions are not detrimentally affected.

In example embodiments, in order to monitor and/or track UE entering and/or exiting the control and/or the monitoring ambit (e.g., processes in execution) of special serving cell equipment, one or more global navigation satellite system (GNSS) equipment can be used that can provide geolocation and/or time information to global positioning satellite (GPS) equipment (e.g., transmitter and/or receiver equipment) anywhere on or near the earth where there is an unobstructed line of sight to the one or more GNSS equipment, such as one or more GPS satellites in various earth orbits. Additionally and/or alternatively, other triangulation processes can be used to keep track of UE. For instance, in various embodiments, ranges (e.g., variable distances) can be determined by targeting UE with light amplification by stimulated emission of radiation (e.g., laser) and measuring the time for the reflected light to return to one or more receiver (e.g., lidar) can be used to track UE approaching and/or entering into a determined vicinity of a restricted area. In a similar manner, a detection system that uses radio waves to determine the range, angle, or velocity of objects (e.g., radar) can be used to determine whether or not UE are approaching and/or entering into the control ambit of special serving cell equipment. Other mechanisms to track UE can also include using multilateration (e.g., determining UE position based on the measurement of the times of arrival (TOA) of one or more energy wave (e.g., radio, acoustic, seismic, etc.) having known waveforms and/or speed when propagating either from and/or to multiple emitters and/or receivers of the waves) between one or more network equipment (e.g., serving cell equipment, base station equipment, internet of things (IoT) equipment, picocell equipment, femtocell equipment, and similarly functional equipment). In some instances, a UE's returned signal strength values to various antennae associated with the one or more network equipment can be used to triangulate and provide a positional references as to the trajectory of an individual UE. In additional and/or alternative instances, timing advance (TA) processes can be used as a measure of TOA. Typically, TA is a determined distance from serving cell equipment based at least in part on delay measurements associated with TOA values. TA values can be reported while aerial UE are in communication with serving cell equipment.

The described embodiments, based on determining that UE are approaching a control and/or broadcast ambit of special serving cell equipment, can initiate processes to facilitate and/or effectuate the following tasks: (1) determine all carriers and/or frequencies that special serving cell equipment have available; (2) determine a corresponding likelihood that a group of the carriers and/or group of frequencies emanating from the special serving cell equipment will, from the perspective of UAVs, appear to be overlapping; (3) determine a group of available frequencies that UAVs can support; (4) determine a carrier of the group of carriers and/or a frequency of the group of frequencies and a special serving cell equipment of the special serving cell equipment that the UAV is currently attaching to or is currently attached to; (5) determine a projected trajectory associated with the UAV; (6) determine a target special serving cell equipment to which the UAV will be handed over to and determine an available carrier of the group of carriers or an available frequency of the group of frequencies that the UAV can use; (7) instruct the target special serving cell equipment to decrease enb.tx.gain values of the carrier of the group of carriers and/or the frequency of the group of frequencies that the UAV is currently attached to and increase the enb.tx.gain values of one or more of the other carriers of the group of carriers and/or one or more frequency of the group of frequencies; and (8) monitor the inter-frequency handover performance of the UAV from a first special serving cell equipment to a second special serving cell equipment and use this data to fine-tune enb.tx-.power values for future cases.

In the context of the subject disclosure, network equipment, special serving cell equipment, and/or serving cell equipment can typically be base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, or other such equipment. Further, the disclosed systems and/or methods can be operational at central node global control equipment (e.g., network equipment) located in the core network. Examples of central node global control equipment can be mobile edge computing (MEC) equipment, self organized network (SON) equipment, and/or radio access network intelligent controller (RIC) equipment.

In some embodiments, UE information data and/or UE device type data is collected. It can be detected when, where, and whether an aerial UE is attached to, and/or is in operative communication with, the core network (or identifiable segments of the core network). Additionally, in accordance with further example embodiments, data can be collected that is representative of special serving cell equipment capabilities, as well as network topologies of special serving cell equipment (e.g., the network topologies of special serving cell equipment currently providing service to aerial UE situated within the broadcast range of current special cell equipment and neighboring special serving cell equipment that can be immediately proximate to, or positioned at distance from, the current special serving cell equipment). In accordance with various other example embodiments, data can also be collected that is representative of the geographical topographies and/or locations within which current serving cell equipment and its neighboring serving cell equipment are situated.

In accordance with some embodiments, based at least in part on data representative of UE information and UE device type, it can be determined whether or not a UE is an aerial UE or UAV. Information in regard to whether or not UE is an aerial type UE or terrestrial based UE can be conveyed and communicated to central node global control equipment as a flag comprising one or more bits. The central node global control equipment can then utilize and/or consult, for example, one or more database equipment comprising groups of relevant database tuples to correlate the received bits with an UE type (e.g., aerial UE or terrestrial based UE).

Now with reference to FIG. 1 that illustrates a system 100 (e.g., network equipment—central node global control equipment) that can improve handover performance when servicing aerial UE or UAVs over advanced networks, such as LTE and/or 5G networks, in accordance with various described embodiments.

As illustrated system 100 can comprise performance engine 102 that can be communicatively coupled to processor 104, memory 106, and storage 108. Performance engine 102 can be in communication with processor 104 for facilitating operation of computer and/or machine executable instructions and/or components by performance engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by performance engine 102 to produce one or more useful, concrete, and tangible result, and/or transform one or more articles to different states or things. Further, system 100 can also generate and output the useful, concrete, and tangible results, and/or the transformed one or more articles produced by performance engine 102, as output 112.

In some embodiments, system 100 can be Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to dynamically configure inter-cell interference coordination between terrestrial based serving cell equipment that are serving aerial UE. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aero-nautical/avionic devices associated with, for example, orbiting satellites and/or associated aeronautical vehicles, and the like.

Performance engine 102 can identify UE, e.g., UAV, based at least in part, for example, on IMSI values, or SIM values. Additionally and/or alternatively, performance engine 102 can identify approaching UE based on other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

In other embodiments, identification of UAV can be facilitated by performance engine 102 through use of one-dimensional and/or multi-dimensional scanning technologies and barcode symbology, such as UPCs, matrix bar codes comprising machine-readable optical labels, and the like that can include information about the equipment to which it is attached.

In yet additional embodiments, identification of UAV can be effectuated by performance engine 102 by using computer-vision based recognition technologies, wherein one or more unique surface contours (or identifiable surface point patterns) of the approaching UE can be compared with repositories and databases of manufacturer defined contours or determinable surface point patterns associated with UAV.

In additional and/or alternative other embodiments, the performance engine 102 can employ artificial intelligence technologies, neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

Performance engine 102, in order to track UAV can also use one or more global navigation satellite system (GNSS) equipment (e.g., global positioning system (GPS) that can provide geolocation and/or time information to GNSS equipment anywhere on or near the earth where there is an unobstructed line of sight to the one or more GNSS equipment, such as one or more GNSS satellites in various earth orbits.

Additionally and/or alternatively, performance engine 102, in some embodiments, can use other triangulation processes to keep track of UAV. For instance, in various embodiments, methods for determining ranges (e.g., variable distances) by targeting UAV with light amplification by stimulated emission of radiation and measuring the time for the reflected light to return to one or more receiver can be used to track UAV. In a similar manner, performance engine 102 can use the facilities and/or functionalities of detection systems that use radio waves to determine the range, angle, or velocity of objects to track UAV.

Other mechanisms used by performance engine 102 to track UAV can also include determining UAV position based on the measurement of the time of arrival (TOA) of one or more energy wave having known waveforms and/or speed when propagating either from and/or to multiple emitters and/or receivers of the waves such as one or more network equipment (e.g., serving cell equipment, base station equipment, IoT equipment, picocell equipment, femtocell equipment, and similarly functional equipment). In some instances, a UAV's returned signal strength values to various antennae associated with the one or more network equipment (e.g., network equipment 100, special serving cell equipment, base station equipment, IoT equipment, picocell equipment, femtocell equipment, and similarly functional equipment, . . . ) can be used to triangulate and provide positional references as to the trajectory of an individual UE.

Performance engine 102 based on determining that UAV is approaching can initiate processes to facilitate and/or effectuate the following tasks: (a) determine all carriers and/or frequencies that special serving cell equipment have available; (b) determine a corresponding likelihood that a group of the carriers and/or group of frequencies emanating from the special serving cell equipment will, from the perspective of UAVs, appear to be overlapping; (c) determine a group of available frequencies that UAVs can support; (d) determine a carrier of the group of carriers and/or a frequency of the group of frequencies and a special serving cell equipment of the special serving cell equipment that the UAV is currently attaching to or is currently attached to; (e) determine a projected trajectory associated with the UAV; (f) determine a target special serving cell equipment to which the UAV will be handed over to and determine an available carrier of the group of carriers or an available frequency of the group of frequencies that the UAV can use; (g) instruct the target special serving cell equipment to decrease enb.tx.gain values of the carrier of the group of carriers and/or the frequency of the group of frequencies that the UAV is currently attached to and increase the enb.tx.gain values of one or more of the other carriers of the group of carriers and/or one or more frequency of the group of frequencies; and (h) monitor the inter-frequency handover performance of the UAV from a first special serving cell equipment to a second special serving cell equipment and use this data to fine-tune enb.tx.power values for future cases.

In the foregoing manner, performance engine 102 can improve handover performance when servicing aerial UE or UAVs over advanced networks, such as, LTE and/or 5G networks, by monitoring UAV conditions and estimating a UAVs trajectory to predict a target special serving cell equipment that the UAV will handover to. Performance engine 102 can mandate the target special serving cell equipment to reduce enb.tx.gain values of a carrier of carriers and/or a frequency of frequencies that the UAV is currently using and is attached to and boost enb.tx.gain values of one or more other carrier of carriers and/or other frequency of frequencies. By doing this, performance engine 102 can ensure that there is a low likelihood of intra-frequency interference and a high likelihood of inter-frequency overlapping between neighboring special serving cell equipment.

In regard to the terrestrial based special serving cell equipment disclosed herein, these special serving cell equipment are generally used only to provide additional coverage to UAV and typically do not provide coverage to terrestrial based UE. The disclosed terrestrial based special serving cell equipment generally can have a radio-module responsible to transmit and/or receive the LTE/5G waveform. The radio-module can also be responsible to set the waveform gain (e.g., enb.tx.gain) values. Generally, enb.tx.gain values can be set manually, and the enb.tx.gain values can be calibrated to achieve desirable enb.tx.power values. The final enb.tx.power values can be determined based on the following equation:

$$enb.tx.power = radio.enb.tx.power + enb.tx.gain + PA.gain.1 + PA.gain.2,$$

wherein two power amplifiers (PA) are used. enb.tx.gain values can be fine tuned to achieve desirable enb.tx.power values.

The disclosed terrestrial based special serving cell equipment which can provide additional coverage to UAVs can have multiple carriers which can operate in different frequency bands (e.g., first frequency band (F1) and second frequency band (F2)). Also, typically UAVs should be able to tune to multiple frequency bands.

In the context of the subject disclosure, and with regard to FIG. 8, if it is assumed: (i) a UAV is connected to a first terrestrial based special serving cell equipment (Special-eNB.1) using F1; (ii) Special-eNB.1 has two carriers which can operate in F1 and F2, respectively; (iii) second terrestrial based special serving cell equipment (Special-eNB.2) is also operating using F1 and F2; (vi) Special-eNB.2 is a neighboring terrestrial based special serving cell equipment of Special-eNB.1; and (v) that only one UAV is traversing the overlapping broadcast coverage area afforded by Special-eNB.1 and Special-eNB.2, when the UAV approaches Special-eNB.2, in described embodiments, Special-eNB.2 can be required to reduce its enb.tx.gain.F1 values and boost its enb.tx.gain.F2 values. By doing this a low likelihood of intra-frequency interference can be enforced and a high likelihood of inter-frequency overlapping between Special-eNB.1 and Special-eNB.2 can be ensured. Accordingly, the UAV can them discover Special-eNB.2.F2 and perform a handover.

In view of the example system(s) described above, example method(s) that can be implemented in accordance with the disclosed subject matter can be better appreciated with reference to the flowcharts and/or illustrative time sequence charts in FIGS. 2-7. For purposes of simplicity of explanation, a example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 2:
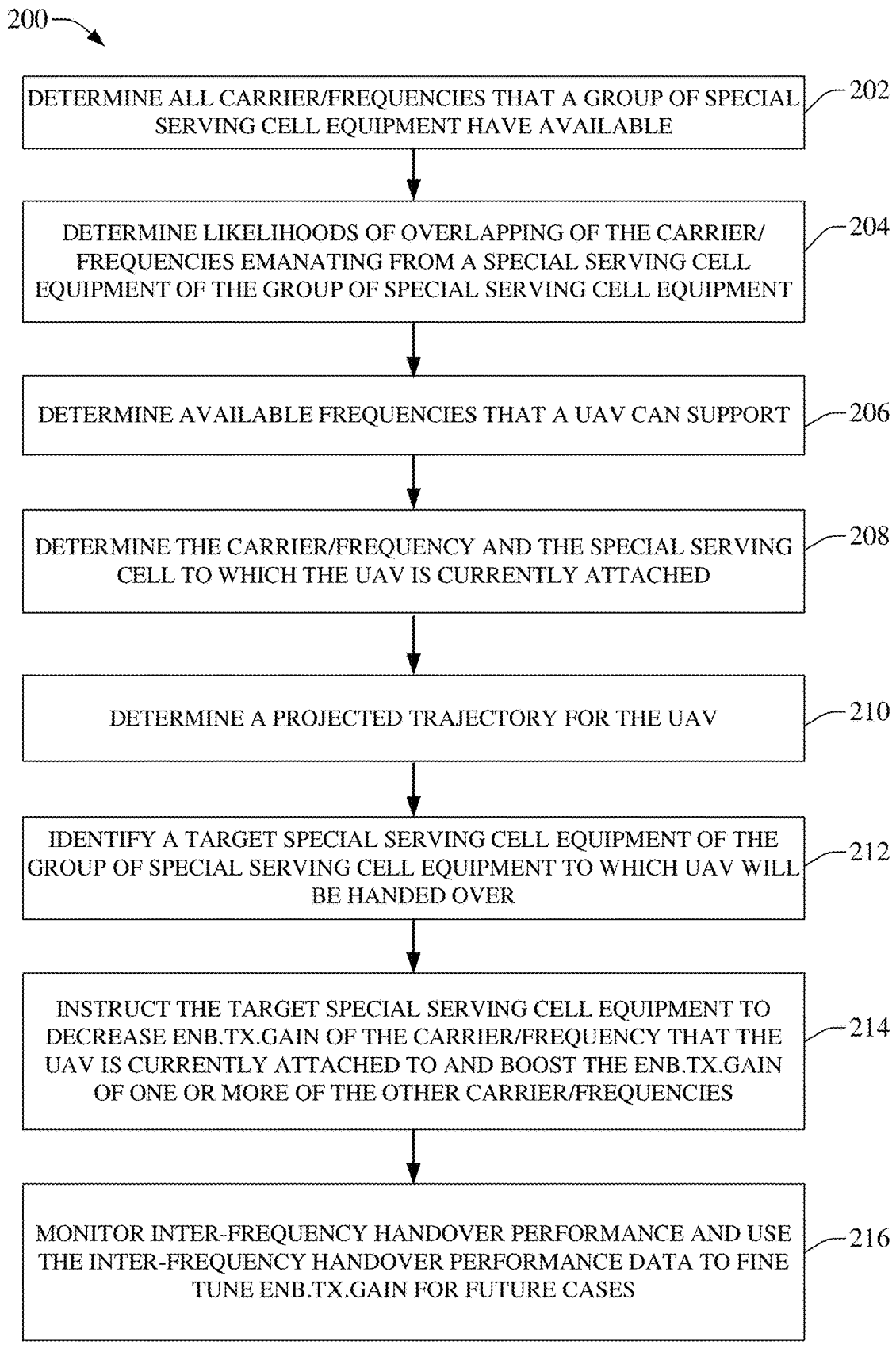
FIG. 2 provides illustration of a flow chart or method that improves handover performance when servicing aerial UE or UAVs over advanced networks, in accordance with aspects of the subject disclosure.

FIG. 2 illustrates a flow chart or method 200 that can be used to improve handover performance when servicing UAVs over LTE/5G networks, in accordance with various embodiments. Method 200 can be used by central node global control equipment located on a core network. Examples of central node global control equipment can be MEC equipment, SON equipment, and/or RIC equipment.

Method 200 can commence at act 202 wherein performance engine 102 can identify UE, e.g., UAV, based at least in part, for example, on IMSI values, or SIM values. Additionally and/or alternatively, at act 202, performance engine 102 can identify approaching UE based on other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

In other embodiments, identification of UAV, in act 202, can be facilitated by performance engine 102 through use of one-dimensional and/or multi-dimensional scanning technologies and barcode symbology, such as UPCs, matrix bar codes comprising machine-readable optical labels, and the like that can include information about the equipment to which it is attached.

In yet additional embodiments, identification of UAV can be effectuated by performance engine 102, at act 202, by using computer-vision based recognition technologies, wherein one or more unique surface contours (or identifiable surface point patterns) of the approaching UE can be compared with repositories and databases of manufacturer defined contours or determinable surface point patterns associated with UAV.

In additional and/or alternative other embodiments, at act 202, performance engine 102 can employ artificial intelligence technologies, neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

Further at act 202, performance engine 102 can determine all carriers and/or frequencies that a group of special serving cell equipment have available. At act 204 performance engine 102 can determine a corresponding likelihood that a group of the carriers and/or group of frequencies emanating from the group of special serving cell equipment will, from the perspective of UAVs, appear to be overlapping. At act 206, performance engine 102 can determine a group of available frequencies that UAVs can support. At act 208, performance engine 102 can determine a carrier of the group of carriers and/or a frequency of the group of frequencies and determine a special serving cell equipment of the group of special serving cell equipment that the UAV is currently attaching to or is currently attached to. At act 210, performance engine 102, can determine a projected trajectory associated with the UAV. At act 212, performance engine 102 can determine or identify a target special serving cell equipment or the group of special serving cell equipment to which the UAV will be handed over to and determine an available carrier of the group of carriers or an available frequency of the group of frequencies that the UAV can use. At act 214, performance engine 102, can instruct the target special serving cell equipment to decrease enb.tx.gain values of the carrier of the group of carriers and/or the frequency of the group of frequencies that the UAV is currently attached to and increase the enb.tx.gain values of one or more of the other carriers of the group of carriers and/or one or more frequency of the group of frequencies. At act 216, performance engine 102, can monitor the inter-frequency handover performance of the UAV from a first special serving cell equipment (e.g., the special serving cell equipment that the UAV is currently attached to) to a second special serving cell equipment (e.g., the target special serving cell equipment to which the UAV will be handed over to) and use this data to fine-tune enb.tx.power values for future cases.

Figure 3:
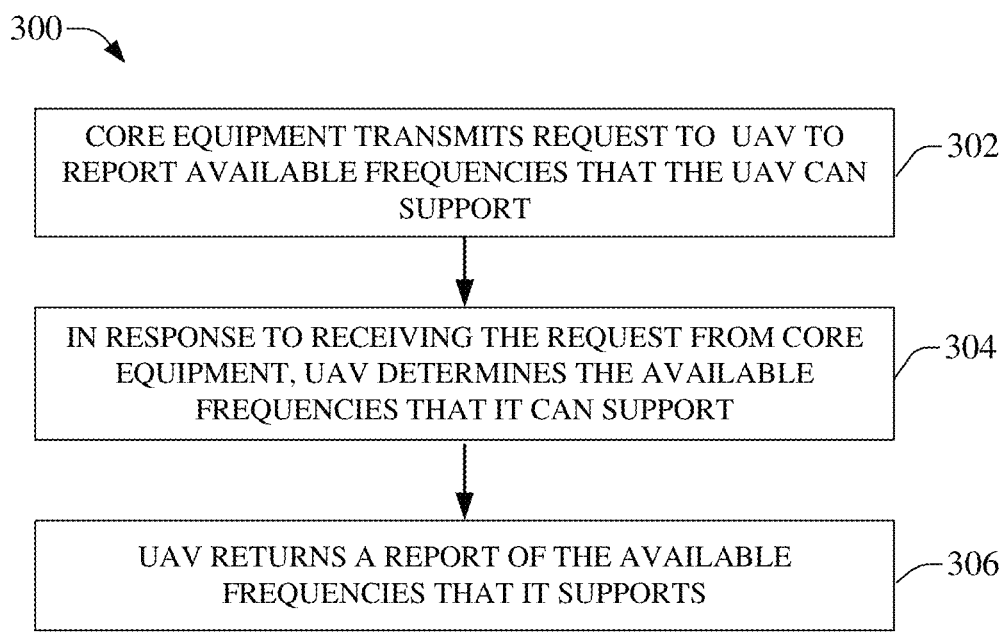
FIG. 3 provides illustration of another flow chart or method that improves handover performance when servicing aerial UE or UAVs over advanced networks, in accordance with aspects of the subject disclosure.

FIG. 3 illustrated a further flow chart or method 300 that can be used to improve handover performance when servicing UAVs over LTE/5G networks, in accordance with various embodiments. Method 300 provides an interaction between core equipment (e.g., network equipment 100) and an UAV. Method 300 can start at act 302 wherein core equipment transmits to the UAV an instruction that the UAV should, on receiving the instruction, to reply with a list of frequencies that it (the UAV) is capable of supporting. At act 304, the UAV, in response to the instruction received from core equipment, can generate a listing of the frequencies that it is capable of supporting. At act 306 the UAV can transmit the generated listing of supported frequencies to the core equipment.

Figure 4:
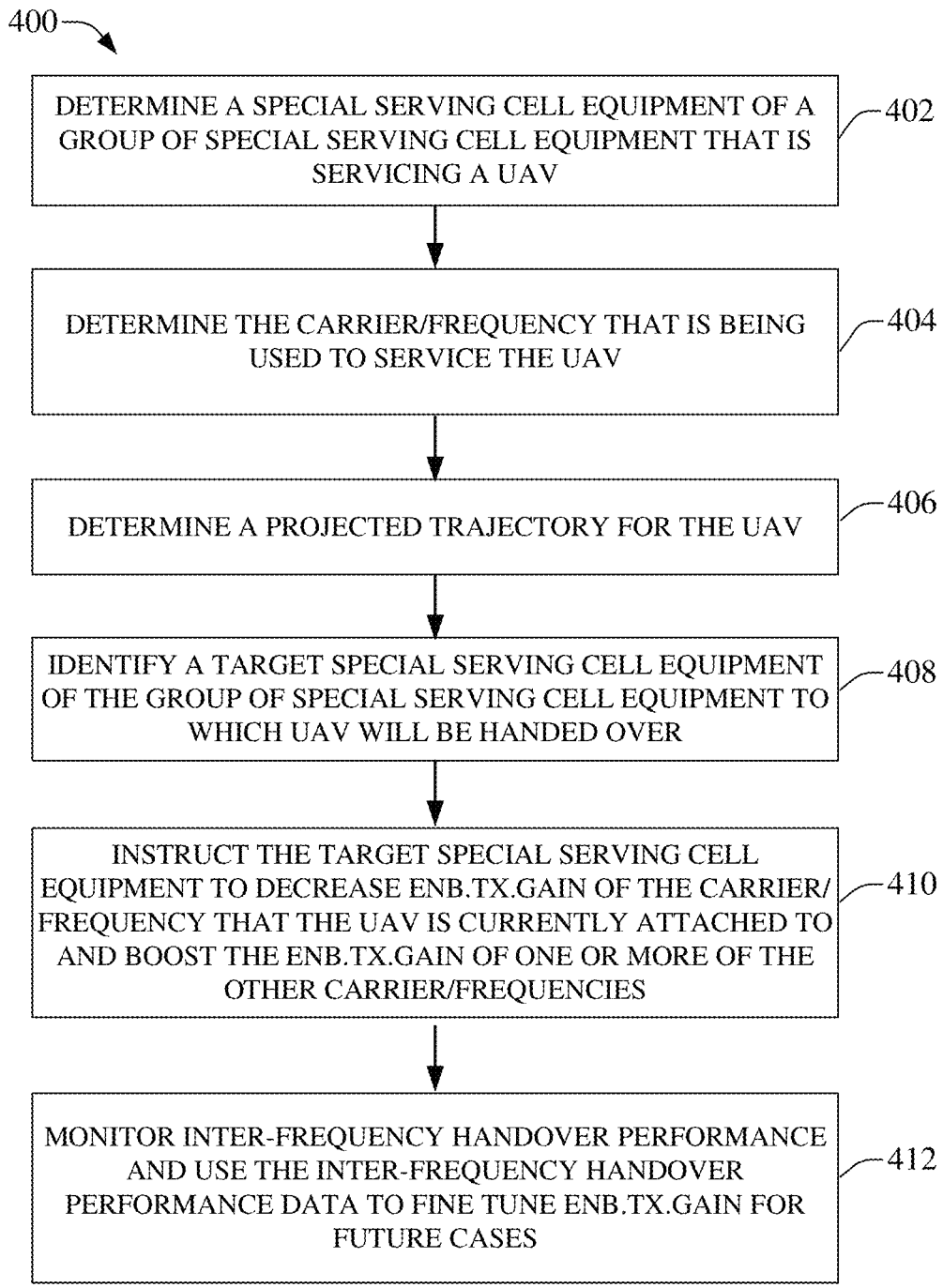
FIG. 4 provides illustration of yet another flow chart or method that improves handover performance when servicing aerial UE or UAVs over advanced networks, in accordance with aspects of the subject disclosure.

FIG. 4 depicts an additional flow chart or method 400 that can be used to improve handover performance when servicing UAVs over LTE/5G networks, in accordance with various embodiments. Method 400 can be implemented by core equipment (e.g. network equipment 100) and a special serving cell equipment and/or a grouping of special serving cell equipment. Method 400 can start at act 402, wherein core equipment can enquire of the special serving cell equipment and/or the grouping of special serving cell equipment whether or not a special serving cell equipment of the grouping of special serving cell equipment are currently servicing a UAV. At act 404 core equipment can determine a carrier of the group of carriers and/or a frequency of the group of frequencies that the special serving cell equipment is using to service the UAV to which the UAV is currently attaching to and/or is currently attached to. At act 406 core equipment can determine a projected trajectory associated with the UAV. At act 408 core equipment can determine or identify a target special serving cell equipment to which the UAV will be handed over to. Additionally, at 408 core equipment can determine an available carrier of the group of carriers or an available frequency of the group of frequencies that the UAV can use. At act 410, core equipment can instruct the target special serving cell equipment to decrease enb.tx.gain values of the carrier of the group of carriers and/or the frequency of the group of frequencies that the UAV is currently attached to and increase the enb.tx.gain values of one or more of the other carriers of the group of carriers and/or one or more frequency of the group of frequencies. At act 412 core equipment can monitor the inter-frequency handover performance of the UAV from the special serving cell equipment to which the UAV was attached to the identified target special serving cell equipment to which the UAV is being handed over to, and thereafter core equipment can use any collected data regarding this transaction to fine-tune enb.tx.power values for future transactions.

Figure 5:
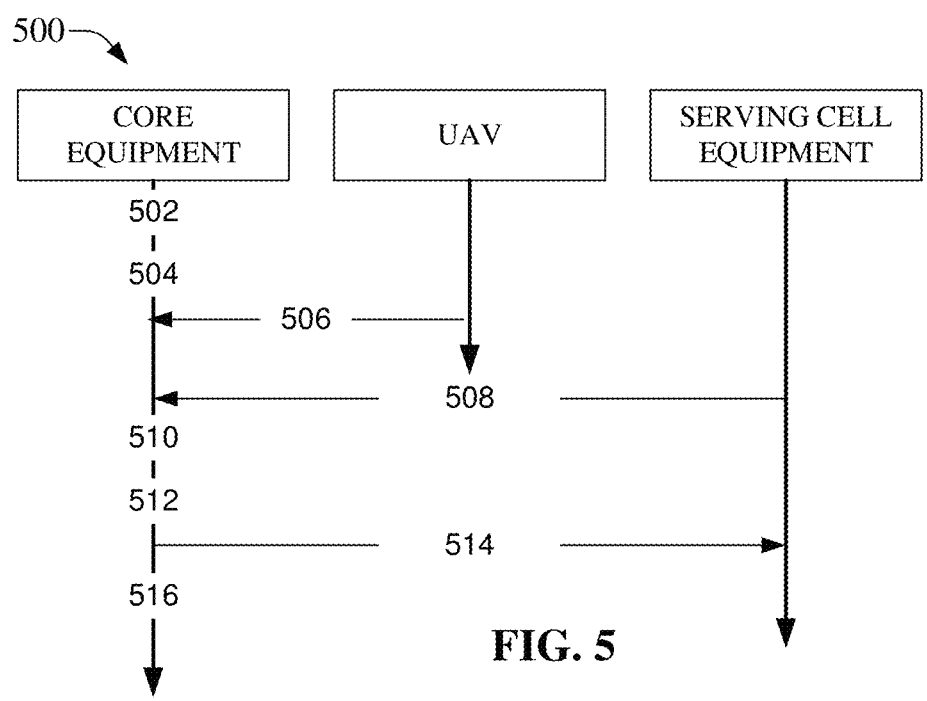
FIG. 5 provides illustration of a time sequence or flow chart that improves handover performance when servicing aerial UE or UAVs over advanced networks, in accordance with aspects of the subject disclosure.

FIG. 5 provides a time sequence chart or method 500 that can be used to improve handover performance when servicing UAVs over LTE/5G networks, in accordance with various embodiments. Time sequence chart 500 can begin at act 502 wherein core equipment, such as network equipment 100, can determine all carriers and/or frequencies that a group of special serving cell equipment have available. At act 504 core equipment can determine a corresponding likelihood that a group of the carriers and/or group of frequencies emanating from the group of special serving cell equipment will, from the perspective of UAVs, appear to be overlapping. At act 506, UAV can transmit to core equipment a collection of available frequencies that the UAV can support. At act 508, core equipment can receive from special serving cell equipment a carrier of the group of carriers and/or a frequency of the group of frequencies, and in response to receiving the carrier of the group of carriers and/or the frequency of the group of frequencies, core equipment can determine a special serving cell equipment of the group of special serving cell equipment that the UAV is currently attaching to, or is currently attached to. At act 510, core equipment, can determine a projected trajectory associated with the UAV. At act 512, core equipment can determine or identify a target special serving cell equipment or the group of special serving cell equipment to which the UAV will be handed over to and can determine an available carrier of the group of carriers or an available frequency of the group of frequencies that the UAV can use. At act 514, core equipment, can instruct the target special serving cell equipment to decrease enb.tx.gain values of the carrier of the group of carriers and/or the frequency of the group of frequencies that the UAV is currently attached to and increase the enb.tx.gain values of one or more of the other carriers of the group of carriers and/or one or more frequency of the group of frequencies. At act 516, core equipment, can monitor the inter-frequency handover performance of the UAV from a first special serving cell equipment (e.g., the special serving cell equipment that the UAV is currently attached to) to a second special serving cell equipment (e.g., the target special serving cell equipment to which the UAV will be handed over to) and use this data to fine-tune enb.tx.power values for future cases.

Figure 6:
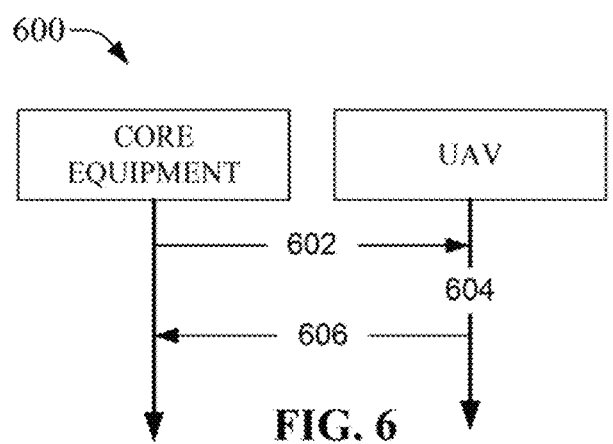
FIG. 6 provides depiction of another time sequence or flow chart that improves handover performance when servicing aerial UE or UAVs over advanced networks, in accordance with aspects of the subject disclosure.

FIG. 6 provides a further time sequence chart or method 600 that can be used to improve handover performance when servicing UAVs over LTE/5G networks, in accordance with various embodiments. Time sequence chart 600 depicts an interaction between core equipment and an UAV. Time sequence chart 600 can commence at act 602 wherein core equipment transmits to the UAV an instruction that the UAV should, on receiving the instruction, to reply with a list of frequencies that it (the UAV) is capable of supporting. At act 604, the UAV, in response to the instruction received from core equipment, can generate a listing of the frequencies that it is capable of supporting. At act 606 the UAV can transmit the generated listing of supported frequencies back to the core equipment.

Figure 7:
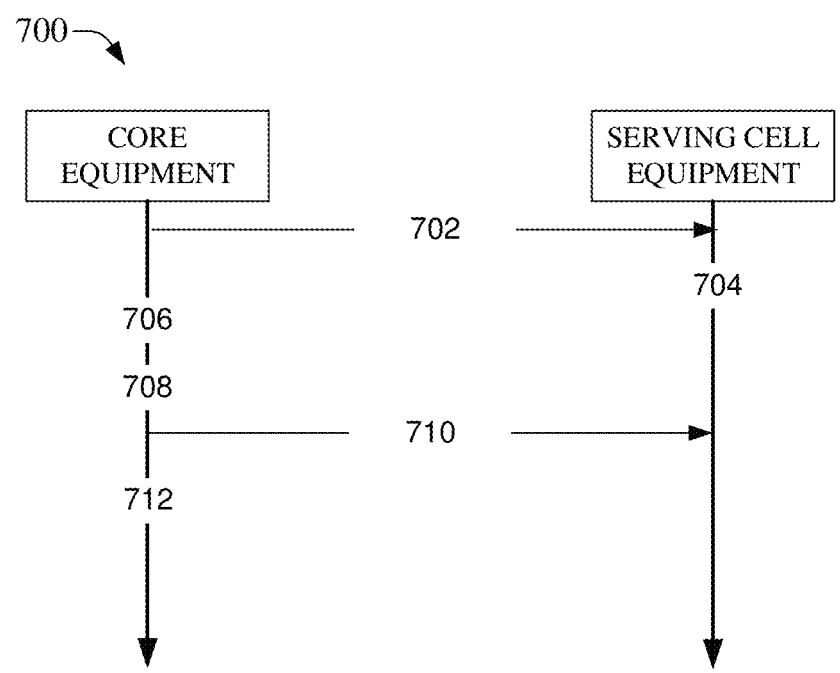
FIG. 7 depicts an additional time sequence or flow chart that improves handover performance when servicing aerial UE or UAVs over advanced networks, in accordance with aspects of the subject disclosure.

FIG. 7 provides an additional time sequence chart or method 700 that can be used to improve handover performance when servicing UAVs over LTE/5G networks, in accordance with various embodiments. Time sequence chart 700 illustrates a sequence of interactions between core equipment and special serving cell equipment. Time sequence chart 700 can being at act 702, wherein core equipment can enquire of special serving cell equipment whether or not a special serving cell equipment of a grouping of special serving cell equipment are currently servicing a UAV. At act 704 special serving cell equipment can determine a carrier of the group of carriers and/or a frequency of the group of frequencies that it is using to service the UAV and to which the UAV is currently attaching to and/or is currently attached to. At act 706 core equipment can determine a projected trajectory associated with the UAV. At act 708 core equipment can determine or identify a target special serving cell equipment to which the UAV will be handed over to. Additionally, at 708 core equipment can determine an available carrier of the group of carriers or an available frequency of the group of frequencies that the UAV can use. At act 710, core equipment can instruct the target special serving cell equipment to decrease enb.tx.gain values of the carrier of the group of carriers and/or the frequency of the group of frequencies that the UAV is currently attached to and increase the enb.tx.gain values of one or more of the other carriers of the group of carriers and/or one or more frequency of the group of frequencies. At act 712 core equipment can monitor the inter-frequency handover performance of the UAV from the special serving cell equipment to which the UAV was attached to the identified target special serving cell equipment to which the UAV is being handed over to, and thereafter core equipment can use any collected data regarding this transaction to fine-tune enb.tx.power values for future transactions.

In regard to the foregoing disclosure, it should be noted that central node global control equipment can collect key performance indicator (KPI) values returned to, or received by, serving cell equipment (or central node global control equipment) by UE (terrestrial based and/or aerial) located within the coverage ambit of serving cell equipment.

Examples of KPI values that can be returned by UE to serving cell equipment can include: values associated with RSRP measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, distance measurement values (e.g., determined based on global positioning satellite (GPS) data, geo-location data, geo-tag data, or other such relevant positioning data) indicating distances between UE and serving cell equipment, distance measurement values indicating distances between UE and respective neighboring serving cell equipment, or other similarly appropriate values. As has been noted, KPI values can be values that can have been periodically returned within measurement reports by UE extant within the control and/or coverage ambit associated with network equipment, such as serving cell equipment, neighboring serving cell equipment, or similar network equipment.

Many use cases of unmanned aerial vehicles (UAVs), such as drones, require beyond visual line of sight (LOS) communications. Mobile networks can offer wide area, high speed, and secure wireless connectivity, which can enhance control and safety of UAV operations and enable beyond visual LOS use cases. Existing long term evolution (LTE) networks can support initial drone deployments. LTE evolution and 5G can provide more efficient connectivity for wide-scale drone deployments. New and exciting applications for drones are being envisioned and are emerging. These envisioned and prospective applications can be a potential boon for mobile network operator entities. Use cases of commercial UAVs are growing rapidly, including delivery, communications and media, inspection of critical infrastructure, surveillance, search-and-rescue operations, agriculture, and similar worthy endeavors.

Research and development of current mobile broadband communication (e.g., LTE) has been primarily devoted to terrestrial based communication. Providing tether-less broadband connectivity for UAVs is an emerging field.

Figure 9:
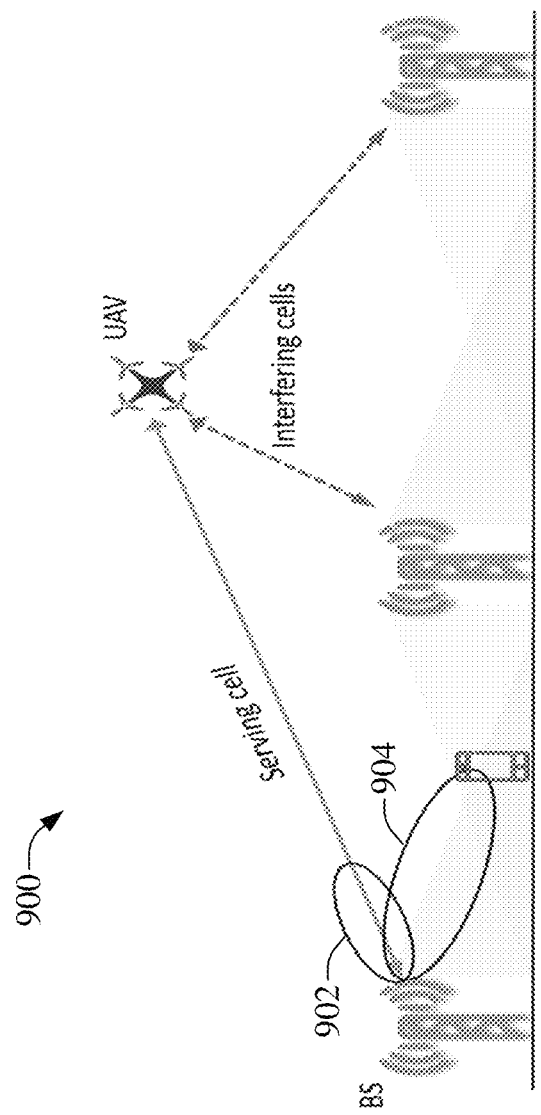
FIG. 9 provides illustration of how network equipment antenna direction affects aerial user equipment, in accordance with aspects of the subject disclosure.

One main aspect that makes using LTE to serve UAVs challenging is the fact that mobile LTE networks are generally optimized for terrestrial broadband communication. Thus, the antennas associated with terrestrial based serving equipment (such as base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like) are typically down-tilted to reduce the interference power levels to other serving cell equipment. With down tilted antennas, small UAVs may thus only be served by transmission or broadcast side lobes of the antennas associated with terrestrial based serving cell equipment. FIG. 9 illustrates the broadcast disparity between the down-tilted antennas 902 and side lobes 904.

Due to the presence of possible voids or nulls in the transmission side lobes 904, and due to close-to-free-space propagation in the sky, aerial UAVs or aerial UEs can detect several ground-based serving cell equipment within a defined geographical area. In addition, aerial UE, since they typically are positioned above terrestrial based radio equipment and above radio signal echo (e.g., radio clutter) emanating from serving cell equipment, can detect stronger signals from distant serving cell equipment (e.g., interfering cells) than terrestrial based UE that are more geographically proximate. Thus, aerial UE can be served by much more distant serving cell equipment (e.g., interfering cells) instead of the most proximate serving cell equipment.

Figure 10:
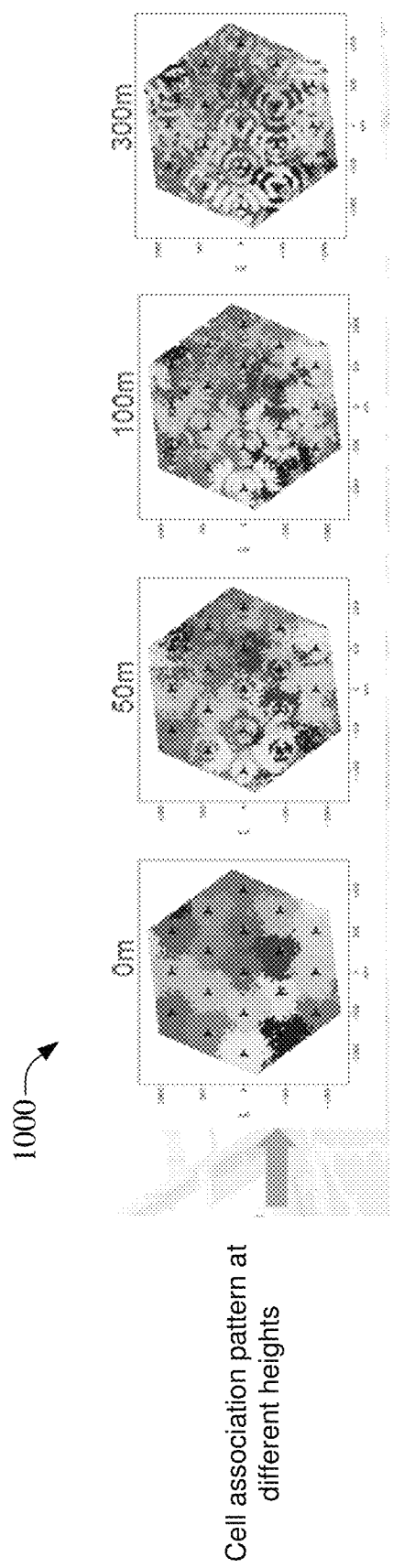
FIG. 10 provides depiction of network equipment association patterns at different altitudes, in accordance with aspects of the subject disclosure.

FIG. 10 provides depiction of the relative disparities in coverage areas between terrestrial coverage areas and aerial coverage areas. In FIG. 10 it will be observed, that at lesser heights, for example, at 0 meters (m) the broadcast coverage area pattern of network cell equipment is generally distinct and clear; the coverage areas being defined clusters around one or more central point associated with respective network cell equipment. However, at greater heights (e.g., 50 m, 100 m, 300 m) above terrain the coverage areas associated with respective network equipment become less and less well defined and more and more amorphous.

Figure 11:
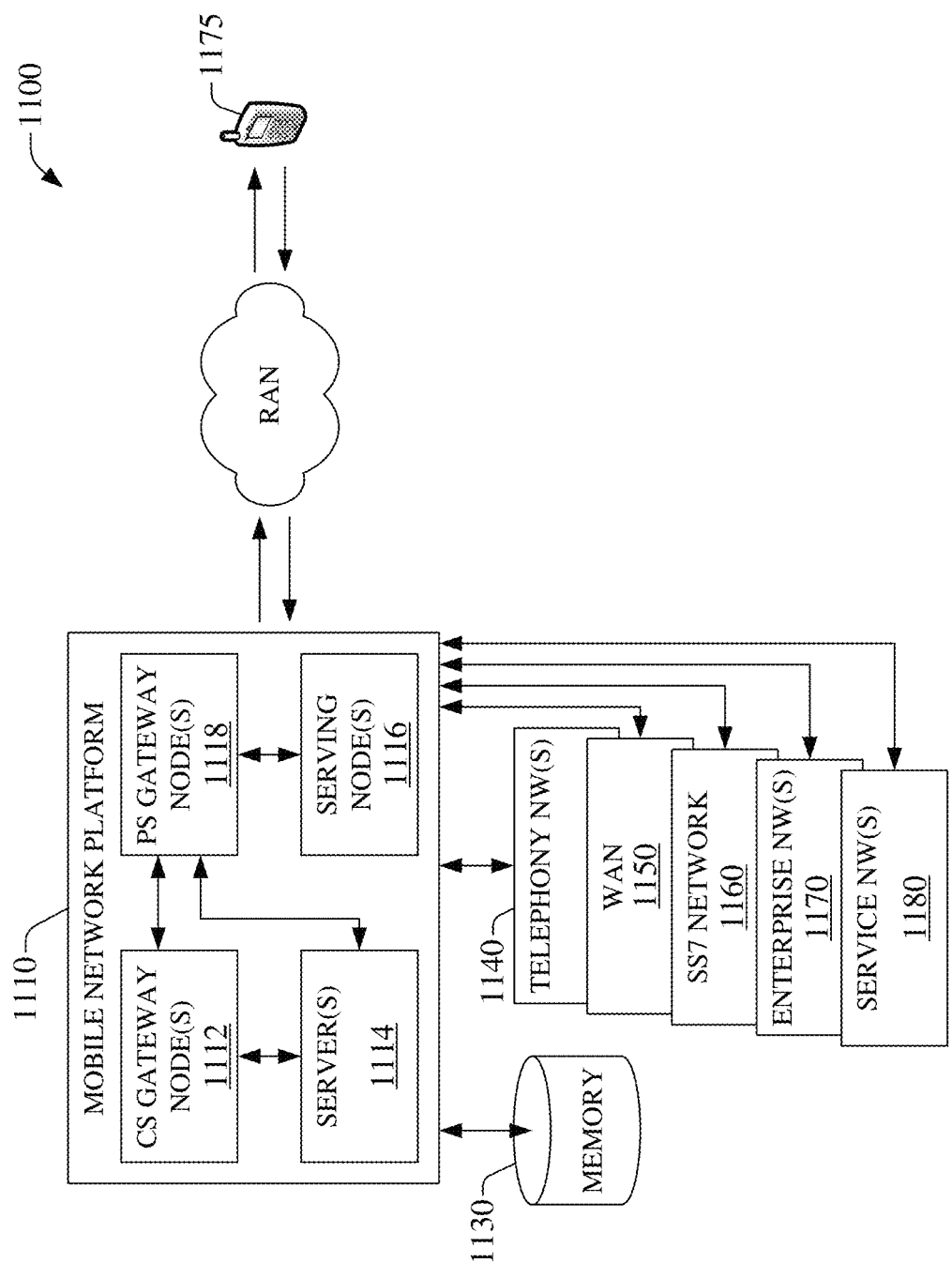
FIG. 11 is a block diagram of an example embodiment of a mobile network platform to implement and exploit various features or aspects of the subject disclosure.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) like IP multimedia subsystem (IMS). Based on radio technology layer(s) available in technology resource(s), packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s), convey the various packetized flows of data streams received through PS gateway node(s) 1118. It is to be noted that for technology resource(s) that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
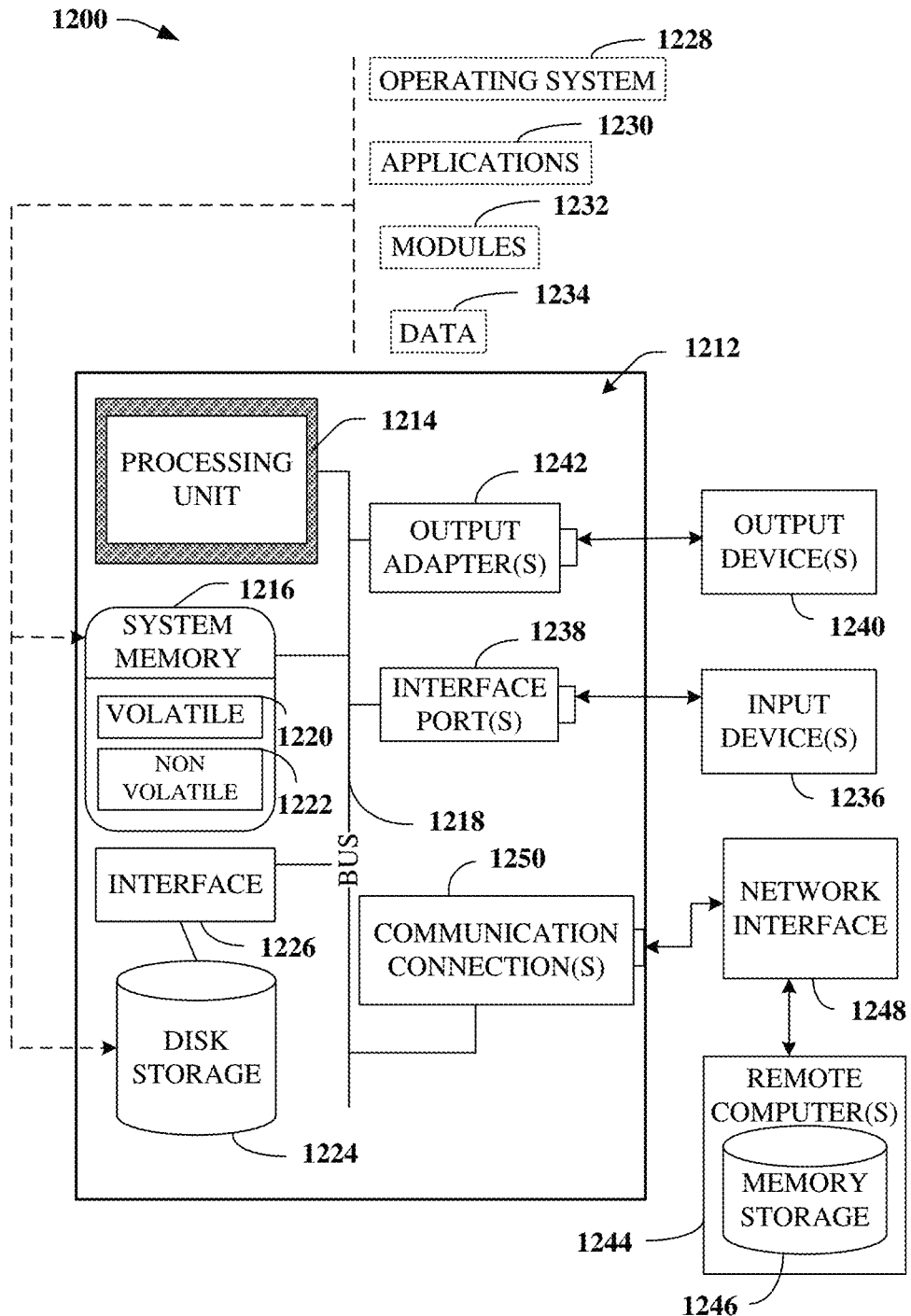
FIG. 12 illustrates a block diagram of a computing system operable to execute the disclosed example embodiments.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute one or more parts of one or more of the disclosed example embodiments. Computer 1212, which can be, for example, part of the hardware of system 100, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus

1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of embodiments illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
   a processor; and
   a memory that stores instructions that, when executed by the processor, facilitates performance of operations by the processor, the operations comprising:
   determining a first group of frequencies that first serving cell equipment is capable of supporting, wherein the first group of frequencies comprises a first frequency;
   identifying that the first frequency of the first group of frequencies and a second frequency of a second group of frequencies are supported by an unmanned aerial vehicle, wherein the first frequency is distinct from the second frequency;
   determining that the unmanned aerial vehicle is using the first frequency of the first group of frequencies to communicate with the first serving cell equipment;
   determining that the unmanned aerial vehicle is approaching second serving cell equipment based on tracking data associated with the unmanned aerial vehicle, wherein second serving cell equipment is capable of supporting the second group of frequencies comprising the first frequency and the second frequency;
   determining a service provided by the first serving cell equipment for the unmanned aerial vehicle is to be transferred in a handover from the first serving cell equipment to the second serving cell equipment in a future time based on a projected trajectory of the unmanned aerial vehicle of the tracking data;
   determining a likelihood of an intra-frequency interference between the first serving cell equipment and the second serving cell equipment in an overlapping coverage area if the first frequency is used by both the first serving cell equipment and the second serving cell equipment to support the unmanned aerial vehicle;
   instructing the second serving cell equipment to adjust a transmission gain value associated with the first frequency to reduce the intra-frequency interference in response to the unmanned aerial vehicle being located in the overlapping area between the first serving cell equipment and the second serving cell equipment; and
   performing the handover of the unmanned aerial vehicle from first serving cell equipment to the second serving cell equipment.

2. The system of claim 1, wherein the first serving cell equipment and the second serving cell equipment are special serving cell equipment, and wherein the special serving cell equipment are associated with groups of up tilted antennas.

3. The system of claim 1, wherein the first serving cell equipment and the second serving cell equipment are capable of transmitting, using up tilted antennas, at a transmission power value greater than standard serving cell equipment that serve terrestrial based user equipment.

4. The system of claim 1, wherein the first serving cell equipment and the second serving cell equipment comprise a group of amplifiers configured as a cascade of amplifiers.

5. The system of claim 1, wherein the second serving cell equipment is special serving cell equipment, and wherein, in response to the transmission gain value associated with the first frequency being adjusted, the overlapping coverage area associated with the first frequency associated with the first serving cell equipment is reduced.

6. The system of claim 1, wherein the second serving cell equipment is special serving cell equipment, and wherein, in response to the second serving cell equipment receiving an instruction to adjust a transmission gain value for the second frequency, the overlapping coverage area of the second frequency associated with the second serving cell equipment is expanded.

7. The system of claim 1, wherein the unmanned aerial vehicle is located in the overlapping coverage area between the first serving cell equipment and the second serving cell equipment, and wherein in response to a transmission gain change associated with the first frequency of the second serving cell equipment, the intra-frequency interference in the overlapping coverage area between first serving cell equipment and the second serving cell equipment is reduced.

8. The system of claim 1, wherein the unmanned aerial vehicle is located in the overlapping coverage area between the first serving cell equipment and the second serving cell equipment, and wherein in response to the instructing the second serving cell equipment to adjust the transmission gain value, the unmanned aerial vehicle performs the handover from the first frequency of the first serving cell equipment to the second frequency of the second serving cell equipment.

9. A method comprising:
determining, by a processor, a first group of frequencies that first serving cell equipment is capable of supporting, wherein the first group of frequencies comprises a first frequency;
identifying, by the processor, that the first frequency of the first group of frequencies and a second frequency of a second group of frequencies are supported by an unmanned aerial vehicle, wherein the first frequency is distinct from the second frequency;
determining, by the processor, that the unmanned aerial vehicle is using the first frequency of the first group of frequencies to communicate with the first serving cell equipment;
determining, by the processor, that the unmanned aerial vehicle is approaching second serving cell equipment based on tracking data associated with the unmanned aerial vehicle, wherein second serving cell equipment is capable of supporting the second group of frequencies comprising the first frequency and the second frequency;
determining, by the processor, a service provided by the first serving cell equipment for the unmanned aerial vehicle is to be transferred in a handover from the first serving cell equipment to the second serving cell equipment in a future time based on a projected trajectory of the unmanned aerial vehicle of the tracking data;
determining, by the processor, a likelihood of an intra-frequency interference between the first serving cell equipment and the second serving cell equipment in an overlapping coverage area if the first frequency is used by both the first serving cell equipment and the second serving cell equipment to support the unmanned aerial vehicle;
instructing, by the processor, the second serving cell equipment to adjust a transmission gain value associated with the first frequency to reduce the intra-frequency interference in response to the unmanned aerial vehicle being located in the overlapping area between the first serving cell equipment and the second serving cell equipment; and
performing, by the processor, the handover of the unmanned aerial vehicle from first serving cell equipment to the second serving cell equipment.

10. The method of claim 9, wherein the first serving cell equipment and the second serving cell equipment are special serving cell equipment, and wherein the special serving cell equipment are associated with groups of up tilted antennas.

11. The method of claim 9, wherein the first serving cell equipment and the second serving cell equipment are capable of transmitting, using up tilted antennas, at a transmission power value greater than standard serving cell equipment that serve terrestrial based user equipment.

12. The method of claim 9, wherein the first serving cell equipment and the second serving cell equipment comprise a group of amplifiers configured as a cascade of amplifiers.

13. The method of claim 9, wherein the second serving cell equipment is special serving cell equipment, and wherein, in response to the transmission gain value associated with the first frequency being adjusted, the overlapping coverage area associated with the first frequency associated with the first serving cell equipment is reduced.

14. The method of claim 9, wherein the second serving cell equipment is special serving cell equipment, and wherein, in response to the second serving cell equipment receiving an instruction to adjust a transmission gain value for the second frequency, the overlapping coverage area of the second frequency associated with the second serving cell equipment is expanded.

15. The method of claim 9, wherein the unmanned aerial vehicle is located in the overlapping coverage area between the first serving cell equipment and the second serving cell equipment, and wherein in response to a transmission gain change associated with the first frequency of the second serving cell equipment, the intra-frequency interference in the overlapping coverage area between first serving cell equipment and the second serving cell equipment is reduced.

16. The method of claim 9, wherein the unmanned aerial vehicle is located in the overlapping coverage area between the first serving cell equipment and the second serving cell equipment, and wherein in response to the instructing the second serving cell equipment to adjust the transmission gain value, the unmanned aerial vehicle performs the handover from the first frequency of the first serving cell equipment to the second frequency of the second serving cell equipment.

17. A non-transitory machine-readable medium, comprising executable instructions that, when executed by a processor, facilitate performance of operations by the processor, the operations comprising:

determining a first group of frequencies that first serving cell equipment is capable of supporting, wherein the first group of frequencies comprises a first frequency;

identifying that the first frequency of the first group of frequencies and a second frequency of a second group of frequencies are supported by an unmanned aerial vehicle, wherein the first frequency is distinct from the second frequency;

determining that the unmanned aerial vehicle is using the first frequency of the first group of frequencies to communicate with the first serving cell equipment;

determining that the unmanned aerial vehicle is approaching second serving cell equipment based on tracking data associated with the unmanned aerial vehicle, wherein second serving cell equipment is capable of supporting the second group of frequencies comprising the first frequency and the second frequency;

determining a service provided by the first serving cell equipment for the unmanned aerial vehicle is to be transferred in a handover from the first serving cell equipment to the second serving cell equipment in a future time based on a projected trajectory of the unmanned aerial vehicle of the tracking data;

determining a likelihood of an intra-frequency interference between the first serving cell equipment and the second serving cell equipment in an overlapping coverage area if the first frequency is used by both the first serving cell equipment and the second serving cell equipment to support the unmanned aerial vehicle;

instructing the second serving cell equipment to adjust a transmission gain value associated with the first frequency to reduce the intra-frequency interference in response to the unmanned aerial vehicle being located in the overlapping area between the first serving cell equipment and the second serving cell equipment; and performing the handover of the unmanned aerial vehicle from first serving cell equipment to the second serving cell equipment.

18. The non-transitory machine-readable medium of claim 17, wherein the first serving cell equipment and the second serving cell equipment are special serving cell equipment, and wherein the special serving cell equipment are associated with groups of up tilted antennas.

19. The non-transitory machine-readable medium of claim 17, wherein the first serving cell equipment and the second serving cell equipment are capable of transmitting, using up tilted antennas, at a transmission power value greater than standard serving cell equipment that serve terrestrial based user equipment.

20. The non-transitory machine-readable medium of claim 17, wherein the first serving cell equipment and the second serving cell equipment comprise a group of amplifiers configured as a cascade of amplifiers.

* * * * *